United States Patent

Unruh et al.

[11] Patent Number: 5,836,130
[45] Date of Patent: Nov. 17, 1998

[54] WATER LINE GUIDING AND HOLDING DEVICE

[76] Inventors: Arnold E. Unruh, 1586 W, 1510 North, St. George, Utah 84770; Wade M. Ebling, 1017 Beecher Ave., Brigham City, Utah 84302; R. Dale Hubbard, 435 E. Washington, Ramona, Calif. 92065; Lincoln Powers, 626 N. 2040 East Cir., St. George, Utah 84770

[21] Appl. No.: 800,408

[22] Filed: Feb. 14, 1997

[51] Int. Cl.$^6$ ........................................ E04C 2/52
[52] U.S. Cl. .................. 52/698; 52/699; 52/712; 52/677; 52/220.1; 248/68.1
[58] Field of Search .............. 248/68.1; 52/220.1, 52/220.3, 677, 678, 684, 709, 610, 699, 712, 219, 713, 698

[56] References Cited

U.S. PATENT DOCUMENTS

| | | | |
|---|---|---|---|
| 3,385,545 | 5/1968 | Patton | 248/68.1 |
| 3,464,661 | 9/1969 | Alesi, Jr. | 52/677 X |
| 3,579,938 | 5/1971 | Hanson | 52/678 X |
| 5,067,677 | 11/1991 | Miceli | 248/68.1 |
| 5,085,384 | 2/1992 | Kasubke | 248/68.1 |
| 5,136,985 | 8/1992 | Krowech | 248/68.1 X |
| 5,146,720 | 9/1992 | Turner | 52/220.1 X |
| 5,216,866 | 6/1993 | Ekedal | 52/684 X |
| 5,240,224 | 8/1993 | Adams | 52/699 X |
| 5,377,939 | 1/1995 | Kirma | 248/68.1 |
| 5,419,055 | 5/1995 | Meadows | 52/678 X |
| 5,593,115 | 1/1997 | Lewis | 52/220.1 X |
| 5,615,850 | 4/1997 | Cloninger | 248/68.1 |

*Primary Examiner*—Robert Canfield
*Attorney, Agent, or Firm*—A. Ray Osburn

[57] ABSTRACT

A water line guide for securing the ends of both hot and cold water lines laid below the level of concrete floors to be subsequently poured. The water line guide has means for its anchoring to hold numerous water lines in position to be subsequently connected.

4 Claims, 7 Drawing Sheets

WATER LINE GUIDING AND HOLDING DEVICE

BACKGROUND OF THE INVENTION

1. Field

The field of the invention is devices for securing end portions of under slab water lines at points of emergence upwardly from areas to be covered by concrete floor slabs, during water line placement during building construction.

2. State of the Art

Modern construction of dwellings and other buildings includes placement of water lines beneath concrete floor slabs, to be concealed in the finished dwelling. Numerous such lines are laid in trenches before the concrete is poured. Appliances and other water using devices all receive water from such water lines below the floor slab. The water lines often run from one appliance to another. A cold water line may for example extend from a water heater to a bathtub, and another to a kitchen sink, for example, depending upon the house layout. Thus, it often occurs that 2, 3 or even several water lines ends come together at some single location, such as in the water heater example alluded to above. Once all the lines are laid, the ends must be secured into position for subsequent connection between the lines. In accordance with prior art, the line ends are bundled together, secured only by windings of adhesive duct tape or the like, which is also used to secure the bundle to some accessible above the slab stud or vent pipe. The bundles are very clumsy to handle when the fittings and connectors must be attached to these water line ends before or after the slab is poured.

A method and device is needed to organize, direct and stabilize the water line ends as they emerge upwardly from substrate beneath the level of the floor slab. Such water lines are laid in considerable number in trenches to various water requiring locations, as described above, creating a need for the present invention to hold and organize the many end portions.

BRIEF SUMMARY OF THE INVENTION

With the foregoing in mind, the problem of securing numerous water lines laid under the floor slabs is eliminated or substantially alleviated by the present invention, which provides means of separating, organizing and stabilizing the upwardly extending end portions of the lines laid prior to pouring of the slab. The water line guiding device comprises an elongate narrow plate member having a number of longitudinally spaced apart holes. At any location where one or more under the slab lines emerges upwardly, a water line guide may advantageously be used, secured in place to separate and stabilize the ends of water lines inserted through the holes. The water guide may preferably be placed so that the plate member is generally at the same level as the top of the finished slab, largely concealed to avoid visual clutter. The water line ends, all extending upwardly a few to several inches above the slab level, are held in separated positions for easy identification for later connection to an appliance at that point, or together to serve distant appliances, all as may be required by the water system layout.

Preferably, the water guide is constructed to take advantage of any vent pipes or the like that may be conveniently located for anchoring. A separate cylindrical sleeve is provided which fits around such vent pipes, and at the same time fits inside a cylindrical portion constructed integrally with the plate member. According to a variation of the invention, the separate cylindrical sleeve may be adapted to serve as a coupling between sections of the vent pipe.

Provisions for anchoring the water guide in other locations include mounting tabs upstanding along one or more edges of the plate member. Mounting holes are easily provided through the tabs at the job site, permitting attachment to studs or other available wood framing by nails or screws. However, mounting nails may be driven through thin tab connecting portions even without mounting holes being drilled. If no other anchor member can be found, a wooden block may be placed in the substrate for anchoring the water guide. Advantageously, a short, reduced diameter hole at each end of the plate member accepts an anchoring pin driven into the substrate.

It is therefore the principal object of the invention to provide means of separating and holding the end portions of water lines during construction of an under slab water distribution system.

BRIEF DESCRIPTION OF THE DRAWINGS

In the drawings, which represent the best mode presently contemplated for carrying out the invention, FIG. 1 is a top plan view of a water line guide in accordance with the invention, drawn to a reduced scale, FIG. 2 a central longitudinal vertical cross sectional view of the water line guide of FIG. 1, drawn to the same scale, FIG. 3 a side elevation view of the water line guide of FIG. 1, drawn to the same scale, FIG. 4 a bottom plan view of the water line guide of FIG. 1, drawn to the same scale, FIG. 5 a plan view of a simplified house plan showing a main water supply line from a meter to a central distribution point at a water heater, for hot and cold water to kitchen sinks, a bathtub, a bathroom lavatory, and a bathroom water-flushing commode, FIG. 6 a prior art figure showing water lines ends bundled together by duct tape secured to an upstanding vent pipe, drawn to a reduced scale, FIG. 7 a right front perspective view of a water line guide in accordance with the invention with eight (8) water line ends being held in place by the holes thereof, drawn to a reduced scale.

DETAILED DESCRIPTION OF ILLUSTRATED EMBODIMENTS

Figure 7:
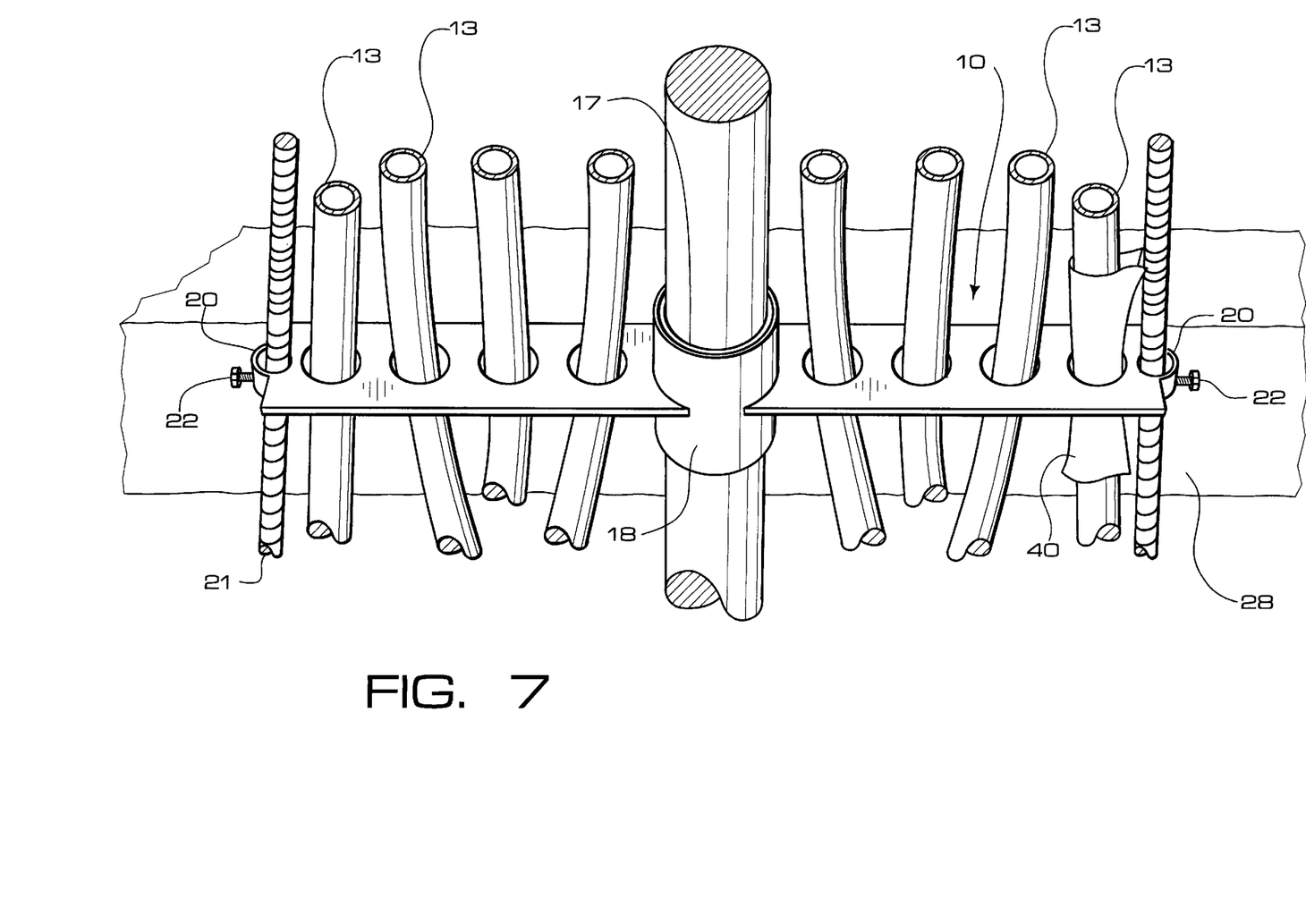
Figure 14:
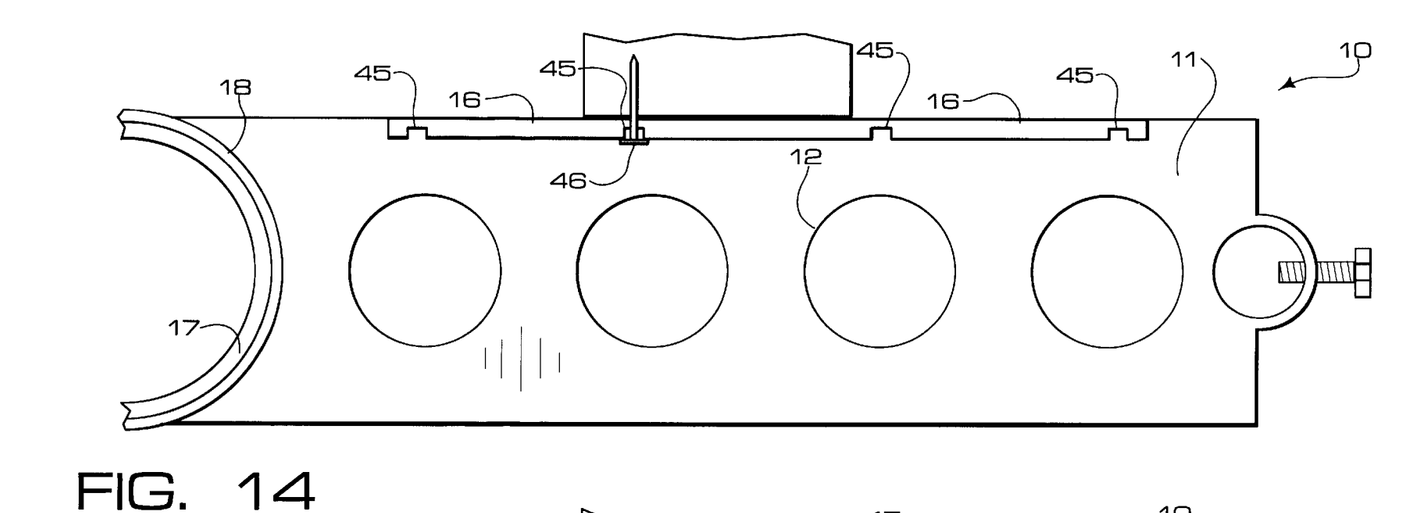
FIG. 14 a top plan view of a fragment of the water line guide of FIG. 1, drawn to approximately full scale, and FIG. 15 a side elevation view of the fragment of FIG. 14, drawn to the same scale.
Figure 15:
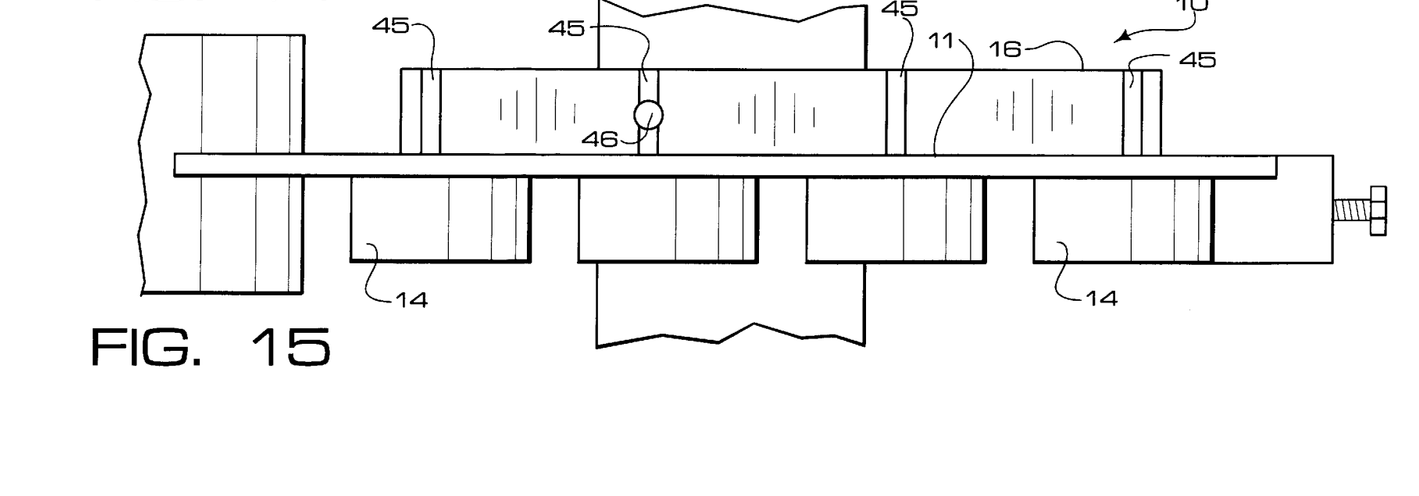

The water line guide 10 comprises a plate member 11 carrying spaced apart guiding holes 12, each accepting an end portion 13 of a water line placed upwardly therethrough. (FIGS. 14 and 15) The guiding holes 12 each advantageously have a short cylindrical guiding sleeve stub 14, which has a suitable inside diameter for use of a standard water line clamping insert 15, if desired. (FIG. 8) Generally, guide 10 is left in place as floor slab 28 is poured and cured. (FIG. 7)

Figures 11, 12, 13:
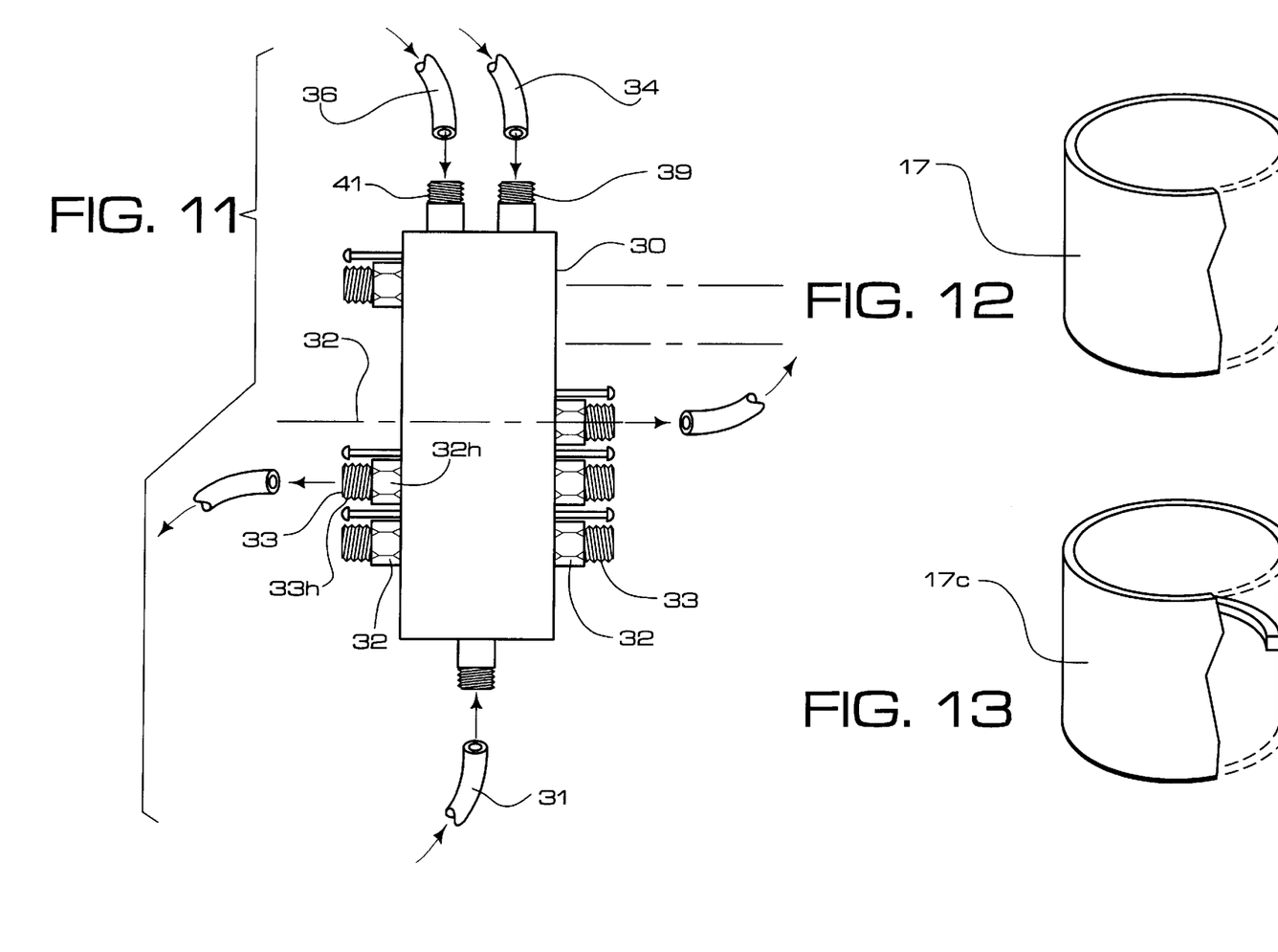

Preferably, the plate member 11 also includes upstanding mounting tabs 16 which provide for anchoring the water line guide upon any conveniently located wall studs or other framing of the house being constructed. (FIG. 14 and 15) Tabs 16 are integral with thin connecting members 45 through which guide mounting nails may be driven without preparatory drilled holes. Also preferably provided is a short cylindrical sleeve 17 sized to fit within a central cylindrical portion 18 integral with plate member 11. The separate cylindrical sleeve 17 is sized to permit its installation around, for example, odor venting upright pipes 19 being built into the house. (FIGS. 7, 12 and 13) The water line guide may thus be attached to such a pipe. The sleeve may be configured to serve as a coupling 17c between sections of the vent pipe. (FIG. 13)

Figure 8:
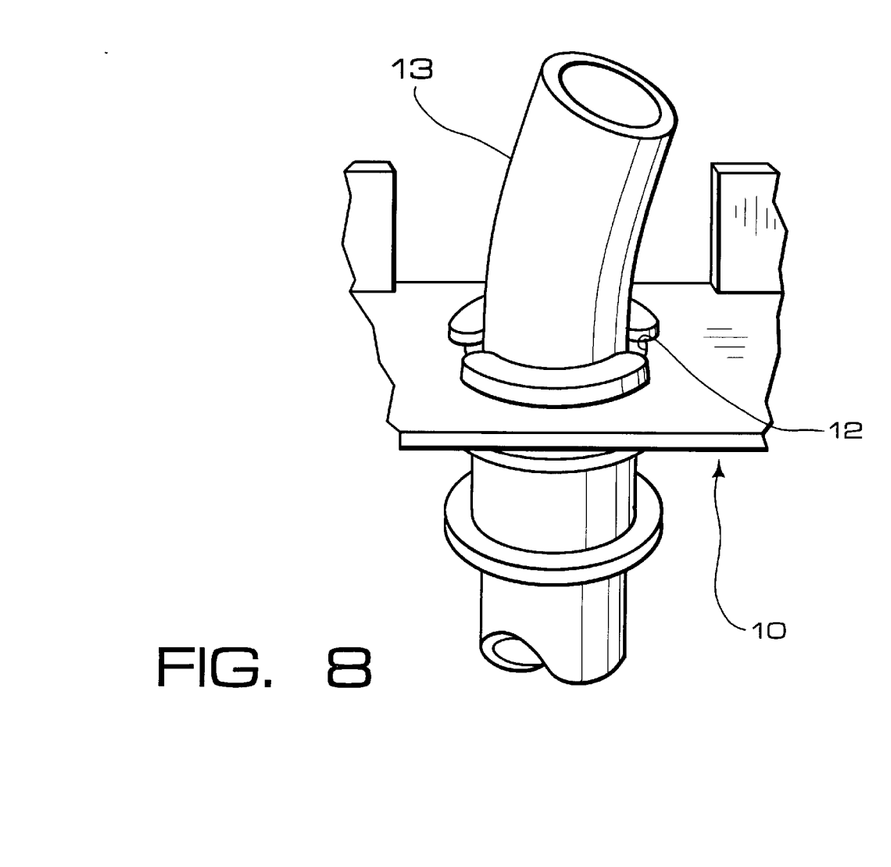
FIG. 8 a front perspective view of a water line being secured in place within a guide hole by a commercially available split ring clamp, drawn to substantially full scale, FIG. 9 another embodiment of the water line guide secured to an upstanding vent pipe, but having flexible elastic clamping members for easy insertion of the water lines thereinto, drawn to the scale of FIG. 8, FIG. 10 a perspective view of yet another embodiment of the water line guide of the invention, having only open notches on the outstanding plate, each water line being secured into the notch by a wire tie, drawn to the scale of FIG. 9, FIG. 11 a schematic representation of a water manifold device and connecting water lines, FIG. 12 a perspective view of the separate sleeve which is used about a vent pipe with the water line guide, drawn to a reduced scale, FIG. 13 a perspective view of a separate sleeve which is used as a pipe coupling and simultaneously as a water line guide sleeve.

A smaller hole 20 at each end of plate member 11 provides another way of anchoring water guide 10. A steel pin 21, which may be a length of small diameter concrete reinforcing bar, is driven into the ground through each end hole 20. (FIG. 7) A locking screw 22 may be used to firmly attach the water guide 10. Generally, the water line end portions 13 may be left loose within the guiding openings 12. However, wrappings of plastic sheet 40 or the like may be used to secure the water line ends 13 more snugly in the holes. (FIG. 7) If the line ends 13 are left loose, the removal or replacement of them is facilitated, should this become necessary before the floor slab is poured. A firm immovable restraint may sometimes be required or preferred, and the standard split sleeves 15 mentioned above are then used. (FIG. 8)

Figure 6:
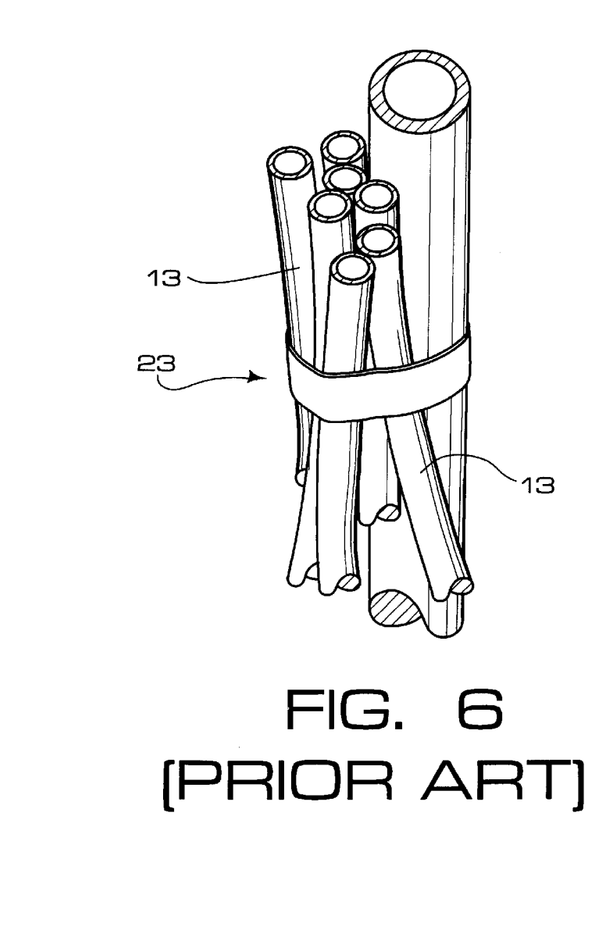

The water line guide 10 evolved from the need for managing, i.e. keeping track of, the many water lines used in new home construction employing slab flooring with water lines underneath. The slab flooring is poured after all the water lines are in place, with the numerous ends emerging upward to above the level of the floor, where some are connected together and others directly to appliances. Previously, as seen in state of the art FIG. 6, all of the water line ends 13 were gathered into clumsy taped together bundles 23, which were attached to a convenient vent pipe or the like.

Figures 1, 2:
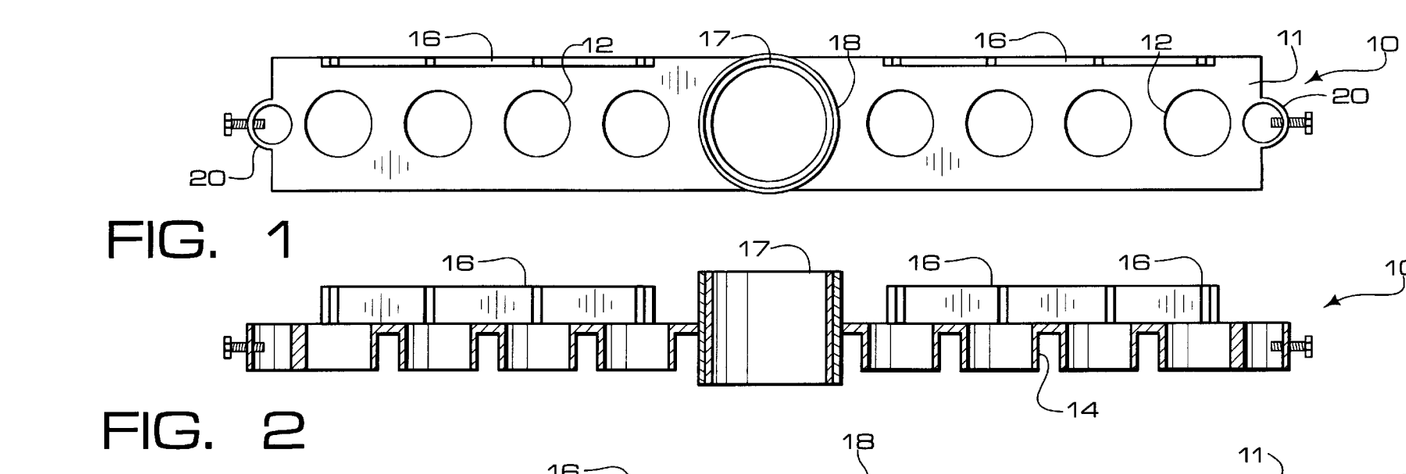
Figures 3, 4:
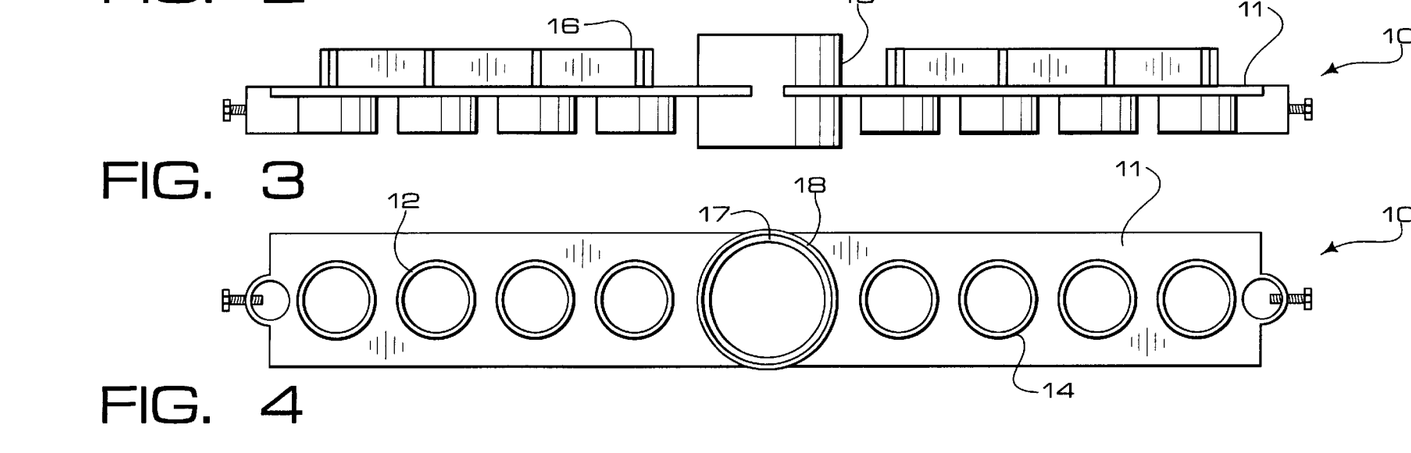
Figure 5:
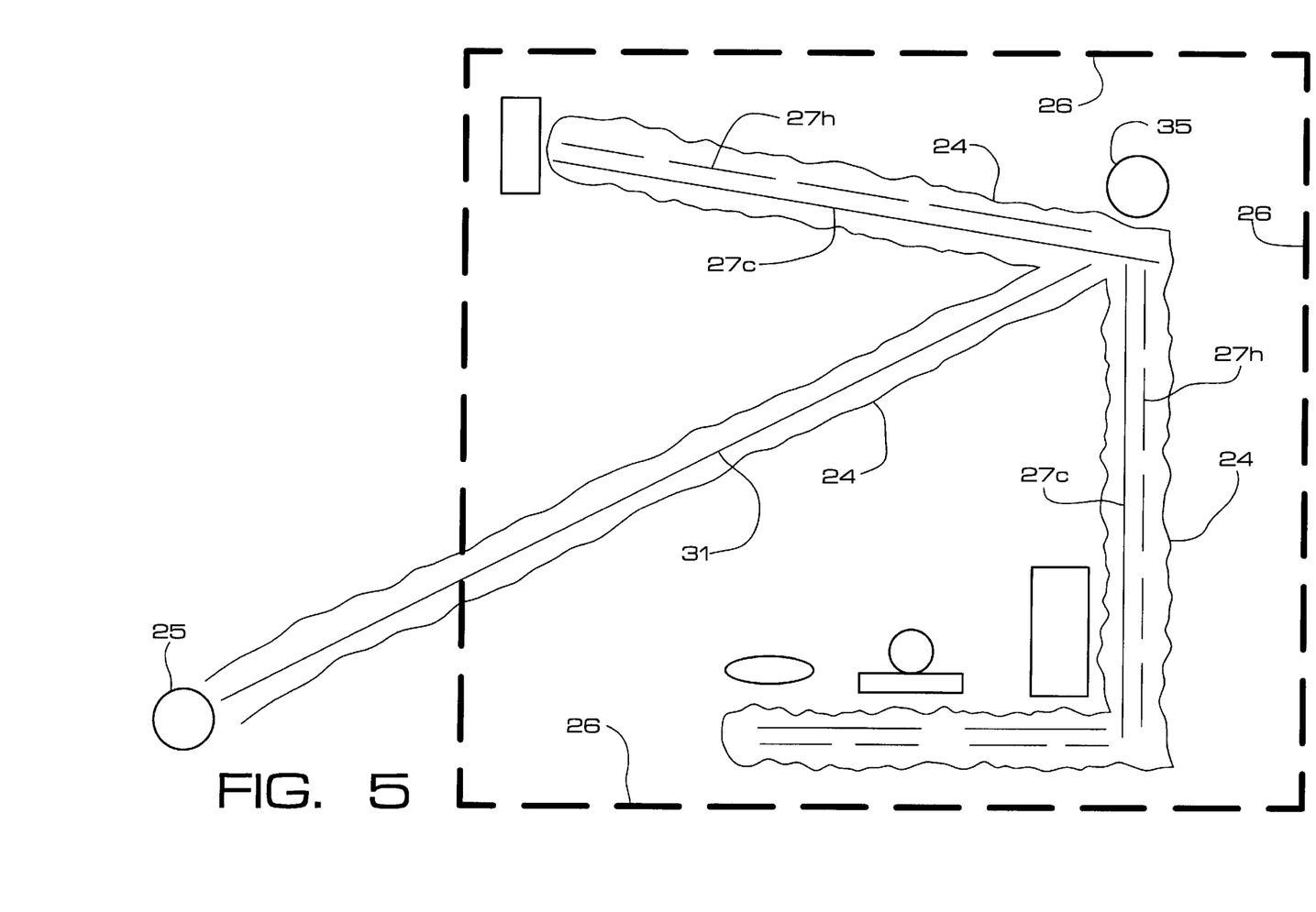

To illustrate the need for the water line guide 10, water lines are shown schematically for a simplified house water system in FIG. 5. Water line ditches 24 extend from the water meter 25 into the area upon which the dwelling 26 is being built. The water distribution system of FIG. 5 includes a relatively large (¾") main line 31 connecting the meter 25 with an initial point of supply of water for the dwelling, the water heater 35 in this example. From this location, connecting cold and hot water lines 27c and 27h are laid to other water using locations. Each water line is laid within one of the trenches 24 pre-prepared within the boundary 26 of the floor of the house. At each of these locations, an end portion 13 of each water line extends upward to above the level later to be occupied by the concrete floor slab 28. After all of the water lines 27 are placed in the trenches 24, the upstanding end portions 13 are stabilized and positioned by water line guide 10. (FIG. 7)

In this example, the water line guide 10 is used to separate and secure the ends of each of the five water lines at the water heater 35, extending through one of the guide holes 12. Preferably, the water line 10 is mounted with the plate member 11 generally flush with the top surface of slab 28. Various alternative ways of mounting the guide are discussed above. A guide mounted upon a vent pipe accommodating eight water line ends is seen FIG. 7.

Another type of water distribution system employs a manifold device 30 for directing the hot and cold water. (FIG. 11) The water main line 31 is attached to one end of the device. On opposing sides, numerous valves 32 with connecting nipples 33 permit water to be extracted from the manifold 30 and directed to water using points. The manifold directs both hot and cold water, the former being through valves and nipples connected to a water passage on one side of the device fed from line 36 from the water heater 35. To provide hot water, a large nipple 39 permits connection from the cold water side of the manifold device to the line 34 to the inlet of water heater 35. A similar nipple 41 is provided to connect the return hot water line 36 from the heater. Valves 32h and nipples 33h are used for connection of lines to sinks, bathtubs and the like requiring hot water. All lines from the water manifold are laid in trenches below the level of the floor slab. The manifold ends of these lines pass through the holes 12 in a water line guide 10 mounted, by any available means, at slab level in the vicinity of the manifold 30.

In summary, water line guides 10 are suitable for use at any point of emergence of line end portions 13 above the level of the floor slab, not shown.

The above described water distribution system is only exemplary. Numerous water line layouts could be, and are in fact, used. It may not be most efficient to supply all water using devices by separate water lines from a single distribution point as is done in the water heater main distribution point system and manifold system described above. For example, it may prove more desirable to supply water to a nearby washing machine by a water line from the kitchen sink, rather than from a longer line which may be required from the water heater.

Figure 9:
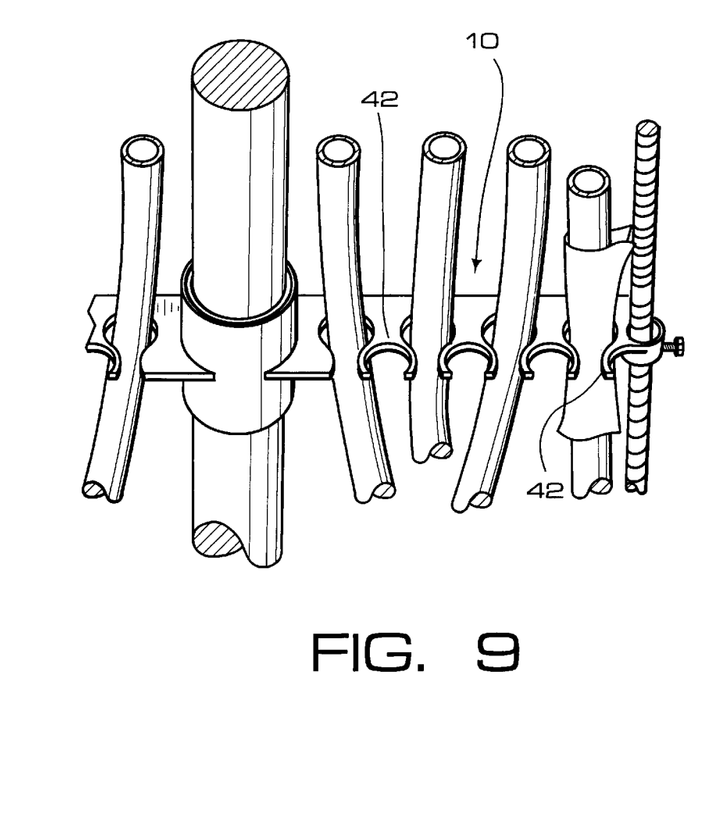
Figure 10:
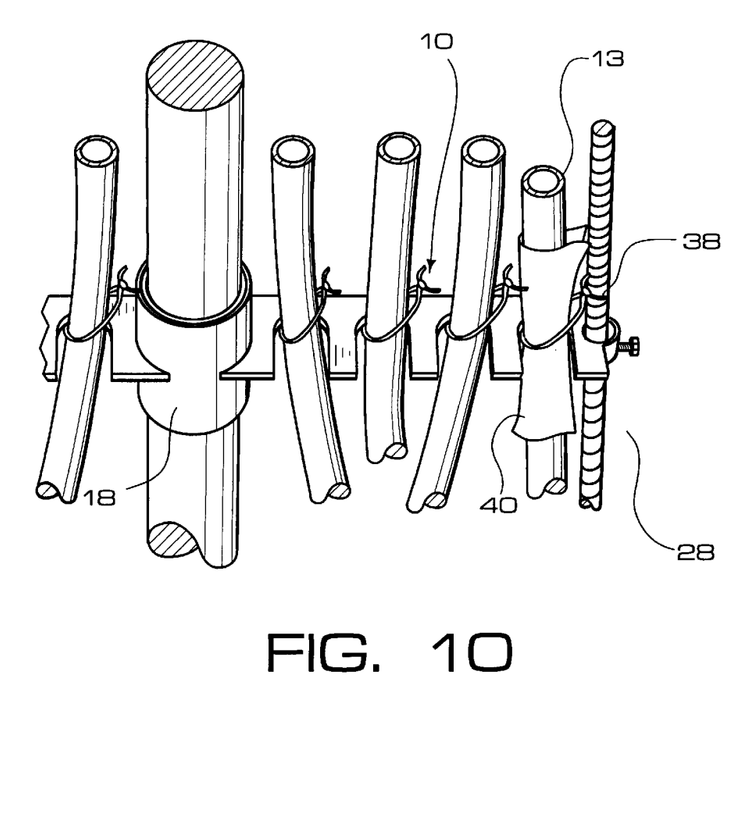

The water line guide device 10 may be provided in other embodiments without departing from the spirit of the invention, so long as the water line ends 13 are held separated and the guide is firmly anchored. For example, the plate with the holes 12 could be replaced with a bar or rod 42 having water line clamping means 37 spaced therealong. (FIG. 9) Or, water line positioning notches 43 could be provided in plate member 11, instead of the holes 12, with wire ties 38, being used to hold the water ends 13 in the notches. (FIG. 10) Still other embodiments, not illustrated, may be within the spirit of the invention.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description, and all changes that come within the meaning and range of equivalency of the claims are, therefore, intended to be embraced therein.

We claim:

1. A device for holding end portions of water lines in separated positions, while said lines are placed for subsequent coverage by a concrete slab floor during construction of a building, said device comprising:

an elongate member having means spaced apart thereal­ong for holding said end portions generally fixed in separated positions;

means for securing the elongate member in fixed position holding said end portions, wherein:

the elongate member is a plate member carrying edges and disposed generally in a horizontal plane and having spaced apart holes therealong, said holes each being sized to accept a water line end portion there­through and wherein the securing means comprises:

a separated cylindrical shell member sized to fit about a vent pipe placed for incorporation into the building being constructed; and a cylindrical shell integral with the plate member and sized to fit about the separate cylindrical shell about the vent pipe.

2. The water line holding device of claim 1, further comprising:

tab means affixed to and upstanding from at least one edge of the plate member, said tab means being securable to wooden stubs of the building being constructed.

3. The water line holding device of claim 2, further comprising:

short cylindrical shell stubs downstanding from each hole in the plate member, wherein said shell stubs and holes are sized to accept a water line gripping split shell insert therein.

4. The water line holding device of claim 2, wherein:

at least a portion of the tab means is adapted for the driving of mounting nails therethrough without prepa­ratory drilling of holes therefor.

* * * * *